United States Patent [19]
Kai

[11] Patent Number: 5,678,070
[45] Date of Patent: Oct. 14, 1997

[54] ACTUATOR BUILT-IN APPARATUS WITH ULTRASONIC WAVE ACTUATORS DRIVEN AT DIFFERENT FREQUENCIES

[75] Inventor: Tadao Kai, Kawasaki, Japan

[73] Assignee: Nikon Corporation, Tokyo, Japan

[21] Appl. No.: 519,644

[22] Filed: Aug. 25, 1995

[30] Foreign Application Priority Data

Aug. 31, 1994 [JP] Japan ................ 6-206543

[51] Int. Cl.⁶ ............... G03B 1/00; G03B 5/00; G03B 7/08; H01L 41/08
[52] U.S. Cl. ............... 396/55; 396/133; 396/261; 396/358; 396/387; 310/316; 310/323; 318/116
[58] Field of Search .............. 354/453, 457, 354/463, 173.1, 152, 234.1, 202, 400, 271.1, 195.12; 310/316, 317, 323; 318/116; 396/52, 55, 85, 248, 261, 358, 406, 469, 387, 133

[56] References Cited

U.S. PATENT DOCUMENTS

| | | | |
|---|---|---|---|
| 4,935,659 | 6/1990 | Naka et al. | 354/173.1 |
| 4,989,030 | 1/1991 | Naka et al. | 354/271.1 |
| 5,053,798 | 10/1991 | Ohara et al. | 354/400 |
| 5,101,278 | 3/1992 | Itsumi et al. | 354/402 |
| 5,130,729 | 7/1992 | Sato et al. | 354/202 |
| 5,198,935 | 3/1993 | Imanari et al. | 354/400 |
| 5,371,427 | 12/1994 | Goto et al. | 310/317 |
| 5,440,212 | 8/1995 | Fukui | 318/116 |
| 5,467,158 | 11/1995 | Murashima et al. | 354/173.1 |

FOREIGN PATENT DOCUMENTS

| | | |
|---|---|---|
| 0 533 328 A1 | 7/1992 | European Pat. Off. |
| 63-131596 | of 1988 | Japan |
| 63-279234 | 11/1988 | Japan |
| 64-60273 | 3/1989 | Japan |
| 5-146174 | of 1993 | Japan |

Primary Examiner—A. A. Mathews

[57] ABSTRACT

An apparatus such as a camera, etc. incorporates at least first and second ultrasonic wave actuators driven at predetermined frequencies for driving the apparatus. The first and second ultrasonic wave actuators are drive-controlled at different frequencies by first and second actuator drive portions controlled by an apparatus control portion. The first and second ultrasonic wave actuators are constructed to satisfy a relationship such as |f1−f2|>4000, where f1 (Hz) is the drive frequency of the first ultrasonic wave actuator, and f2 (Hz) is the drive frequency of the second ultrasonic wave actuator. Prevented thus are drawbacks caused when simultaneously driving the plurality of ultrasonic wave actuators for driving the apparatus, i.e., a resonance in an apparatus structural body and a resultant "beat" phenomenon.

12 Claims, 10 Drawing Sheets

ACTUATOR BUILT-IN APPARATUS WITH ULTRASONIC WAVE ACTUATORS DRIVEN AT DIFFERENT FREQUENCIES

BACKGROUND OF THE INVENTION

1. Field of the Invention

The present invention relates to an actuator built-in apparatus using a plurality of ultrasonic wave actuators as those for driving an apparatus such as, e.g., a camera or the like, i.e., those for driving, e.g., movable mechanism portions in the interior of the apparatus.

2. Related Background Art

A variety of apparatuses from the camera down may be given as this type of actuator built-in apparatus. Then, in the apparatus such as the camera, etc., for example, a ring type or drum type ultrasonic wave actuator (referred to as a USM) is known as the actuator for driving the apparatus.

That is, there has hitherto been known an apparatus using one set of ultrasonic wave actuator as a driving source of a focusing mechanism for focus-driving a lens element of a photographing optical system within a movable mechanism, e.g., a lens barrel mechanism in the interior of the camera described above.

The apparatus such as the above-mentioned camera, etc. incorporates, a plurality of ultrasonic wave actuators employed for drive-controlling a variety of movable mechanisms in the interior of the apparatus.

In other words, the camera or the like incorporates and arranges a plurality of movable mechanisms therein. It is desired to employ the ultrasonic wave actuators each serving as a driving actuator therefor, having a comparatively simple structure, easy to drive-control and capable of exhibiting advantages of being low in rotation but high in torque and low in noise as well as of being constructed to attain the downsizing thereof.

However, when the above camera, etc. incorporates the plurality of ultrasonic wave actuators for driving the apparatus, and if driven substantially at the same drive frequency, there exists a possibility of causing a drawback in which a structural body of the apparatus resonates due to leakage vibrations produced from the plurality of ultrasonic wave actuators.

It is a general practice that particularly the above-described ultrasonic wave actuators are, though specifications thereof are different, driven at the same frequency if equal in size. When simultaneously driving those ultrasonic wave actuators, the above resonance is easy to produce.

Then, if the resonance takes place in the apparatus structural body mentioned above, it follows that a disturbance is applied to each of the ultrasonic wave actuators, and this is not desirable in terms of drive-control of the ultrasonic wave actuators.

Further, if the above resonance is produced, the apparatus structural body and parts may to be damaged or slackened, with the result that a structural problem is thus caused.

Moreover, even when the plurality of ultrasonic wave actuators incorporated into the apparatus such as the camera, etc. are driven at different drive frequencies, there is the possibility of causing a so-called "beat" phenomenon due to the resonance produced if an energy of the leakage vibrations given from the respective ultrasonic wave actuators is large or if the plurality of ultrasonic wave actuators are disposed close to each other.

Then, if a frequency of the "beat" falls within a human audible bandwidth, the "beat" sounds may be audible.

Especially when the above "beat" is produced in the vicinity of 1 KHz, which is highest in acoustic sensitivity to a human being, such a noise grates on the ear of the apparatus user (photographer). It is required that some measures be taken to obviate such a problem.

SUMMARY OF THE INVENTION

It is a primary object of the present invention to provide an actuator built-in apparatus capable of preventing a resonance and a resultant "beat" phenomenon caused when driving a plurality (at least two sets) of ultrasonic wave actuators as apparatus driving actuators driven simultaneously in a camera, etc. serving as the actuator built-in apparatus in the case of the actuators being used in combinations and of obviating a sense of grating on the ear of the apparatus user.

To accomplish the above object, according to one aspect of the present invention, an actuator built-in apparatus comprises at least first and second ultrasonic wave actuators driven simultaneously in combination as actuators for driving the apparatus. Drive frequencies of the first and second ultrasonic wave actuators are set different from each other.

Further, the actuator built-in apparatus according to the present invention is a camera. First and second ultrasonic wave actuators are disposed in one of a camera body and a lens barrel or disposed in a mechanically joined unit of the camera body and the lens barrel.

Further, in the actuator built-in apparatus according to the present invention, f1 (Hz) and f2 (Hz) are set to satisfy the following relationship:

$$|f1-f2|>4000$$

where f1 (Hz) is the drive frequency of the first ultrasonic wave actuator, and f2 (Hz) is the drive frequency of the second ultrasonic wave actuator.

According to the present invention, the plurality of built-in ultrasonic wave actuators for driving the apparatus have drive frequencies different from each other, thereby making it possible to prevent or relieve the resonance in the apparatus structural body.

A frequency fB of the possible-to-occur "beat" is given by:

$$fB=|f1-f2|/2$$

where f1 (Hz) is the drive frequency of the first ultrasonic wave actuator built in for driving the apparatus, and f2 (Hz) is the drive frequency of the second ultrasonic wave actuator built in for driving the apparatus.

Moreover, according to the present invention, the "beat" frequency is expressed such as fB>2000 because of |f1-f2|>4000, and this is higher by 1 or more octaves than 1 KHz, which is highest in acoustic sensitivity. Hence, it is possible to prevent the "beat" grating on the ear of the apparatus user (photographer).

BRIEF DESCRIPTION OF THE DRAWINGS

Other objects and advantages of the present invention will become apparent during the following discussion in conjunction with the accompanying drawings, in which.

DESCRIPTION OF THE PREFERRED EMBODIMENTS

Figure 1:
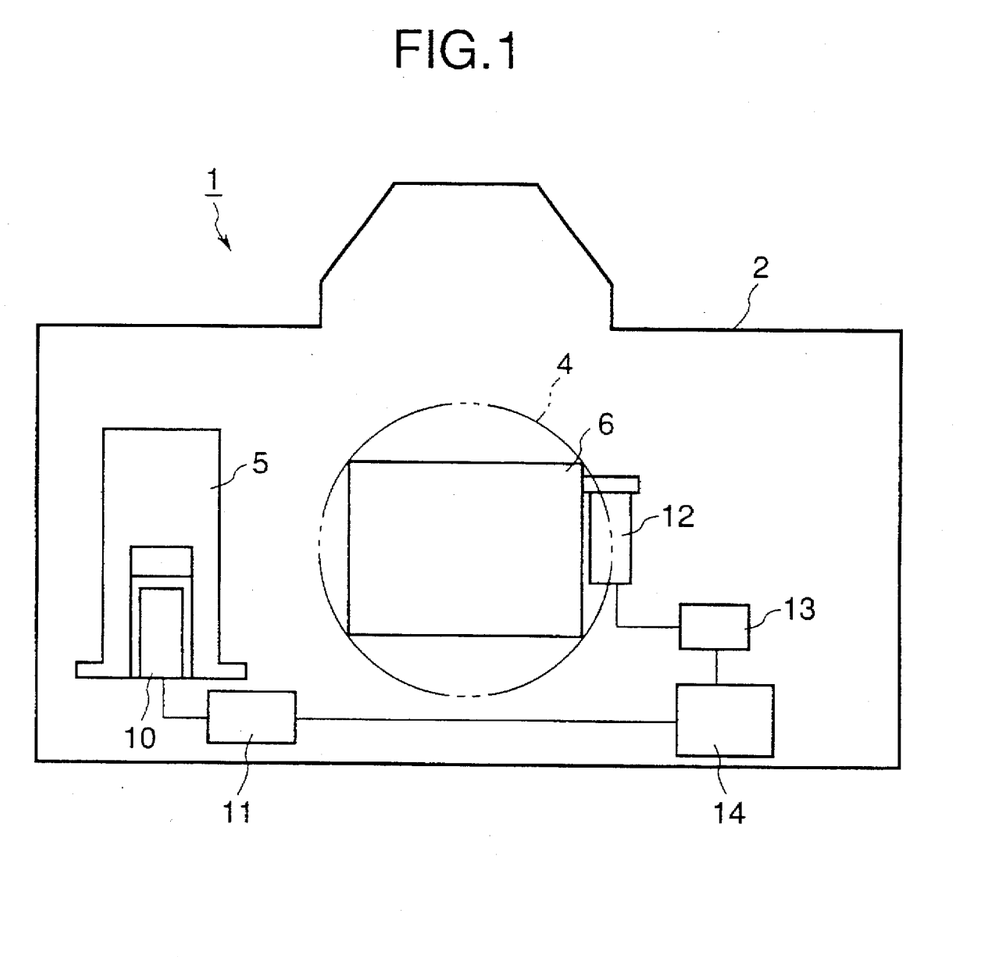
FIG. 1 is a view of a camera body as viewed from the front but illustrates one embodiment in which an actuator built-in apparatus according to the present invention is applied to a camera.
Figure 2:
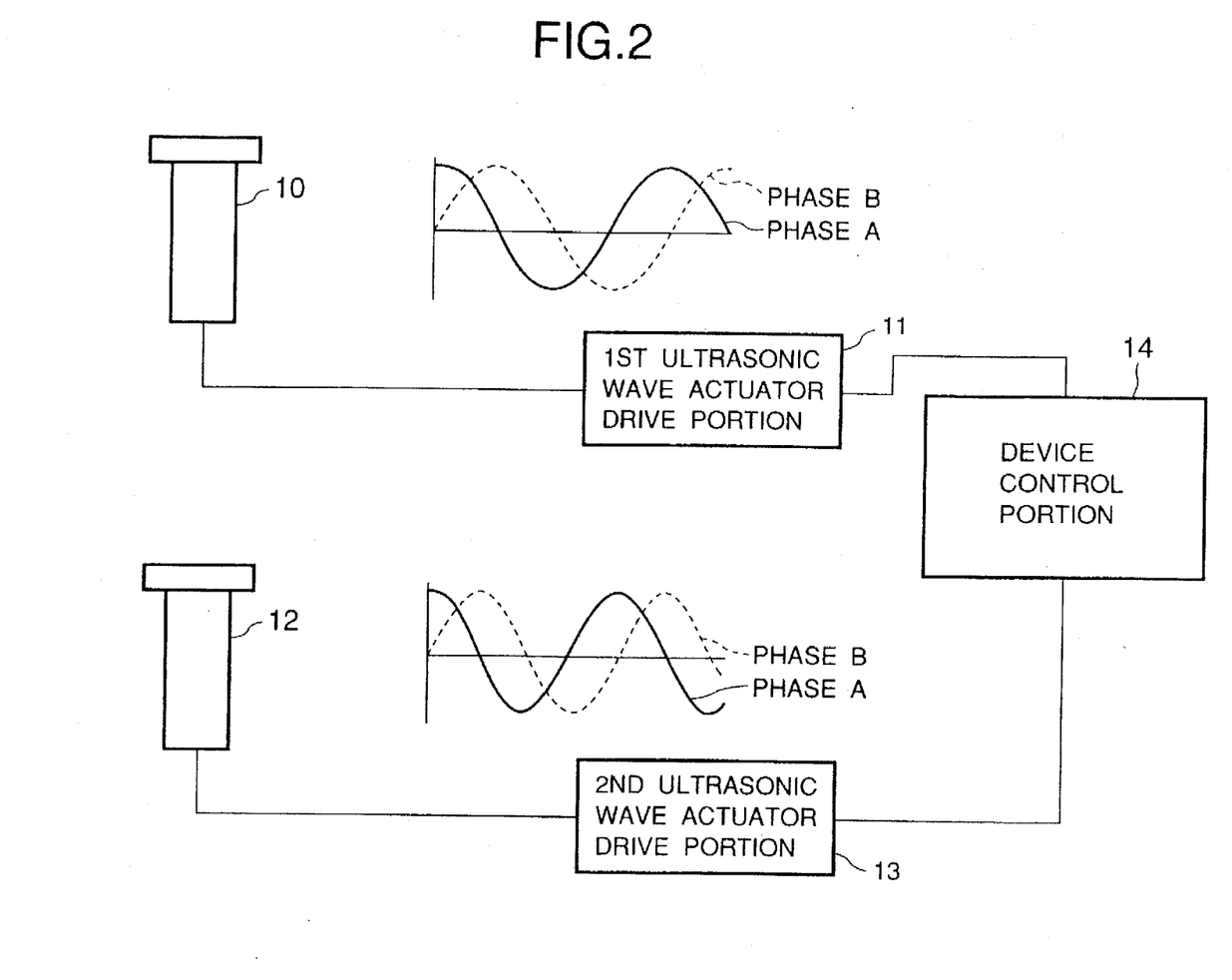
FIG. 2 is a block diagram of assistance in explaining principal components of the actuator built-in apparatus of the present invention.

FIGS. 1 and 2 illustrate one embodiment in which an actuator built-in apparatus of the present invention is applied to a camera.

Referring to these drawings, particularly, FIG. 1, an outline of a construction of the camera suited to an application of the present invention will be briefly explained. The camera designated at 1 in the Figure is constructed of a camera body 2 and a lens barrel (see the numeral 3 in the embodiment shown in FIG. 3).

Note that a lens mount denoted at 4 in the Figure is opened at the central portion of the front surface of the camera body 2, and the lens barrel is fixedly fitted in the lens mount, wherein the lens mount is drawn by an imaginary line in FIG. 1.

Further, a film wind-up spool designated at 5 in the Figure is disposed on the left side of the camera 1 in the Figure. This film wind-up spool 5 incorporates a first ultrasonic wave actuator 10 serving as a film winding actuator. The first ultrasonic wave actuator 10 is drive-controlled by a first ultrasonic actuator drive portion 11 as the necessity arises and is constructed to wind a film frame by frame from a film paterone (both are not illustrated) and thus turns the film.

These ultrasonic wave actuators are ultrasonic wave motors for mutually inputting, e.g., two high-frequency AC voltage signals (phases A and B) with a phase difference and thus performing a driving operation.

A mirror 6 is so disposed as to move on an optical axis of the lens barrel in rear of the lens mount 4. In rear of the mirror 6, an aperture portion (unillustrated) is, as known well, disposed in a face-to-face relationship with a film exposure surface.

Then, a second ultrasonic wave actuator 12 serving as a mirror driving actuator for flipping the mirror up with a release operation is incorporated and disposed in a side-by-side relationship with the mirror 6. The second ultrasonic wave actuator 12 is drive-controlled by a second ultrasonic wave actuator drive portion 13 as the necessity arises and thus constructed to take a photo.

An apparatus control portion 14 drive-controls the first and second ultrasonic actuator drive portions 11, 13, and a construction of a drive control system thereof is shown in a block diagram of FIG. 2.

That is, this embodiment presents a construction in which the camera body 2 of the camera 1 defined as an actuator built-in apparatus incorporates two sets of ultrasonic wave actuators 10, 12 simultaneously driven when performing the photographing operation of the camera as those for winding up the film (for driving the spool) and for driving the mirror (for flipping the mirror up and down).

In the thus constructed camera 1, the film winding operation and the mirror-down operation take place at the same moment in some cases when effecting the photographing in, e.g., a consecutive photographing mode. In this case, the ultrasonic wave actuators 10, 12 are simultaneously driven. As explained above, however, when those two ultrasonic wave actuators 10, 12 are driven at the same drive frequency, a resonance or a "beat" phenomenon occurs. This is undesirable in terms of utility.

For this reason, according to the present invention, preventing the above resonance or the "beat" phenomenon entails, as a characteristic thereof, such a construction that the drive frequencies at which the first and second ultrasonic wave actuators are simultaneously driven by the first and second ultrasonic actuator drive portions 11, 13 as the apparatus driving actuator are, as shown in FIG. 2, set different.

According to this construction, the resonance in the apparatus structural body (camera 1) can be prevented or relieved by differentiating the drive frequency for the plurality of ultrasonic wave actuators 10, 12 incorporated into the camera 1 as those for driving the apparatus. Further, the "beat" phenomenon can be also prevented or relieved.

More specifically, as described above, the drive frequency for the first ultrasonic wave actuator 10 built in the camera 1 as the one for driving the apparatus is set at f1 (Hz), while the frequency for the second ultrasonic wave actuator 12 is set at f2 (Hz). In this case, a frequency of the "beat" which will possibly occur is assumed to be fB (Hz), and the "beat" frequency fB is expressed such as fB=|f1−f2|/2. The "beat" phenomenon can be thereby prevented or relieved.

Further, according to the present invention, let f1 (Hz) be the drive frequency for the first ultrasonic wave actuator 10 and f2 (Hz) be the drive frequency for the second ultrasonic wave actuator 12, and, in this case, the drive frequencies f1 (Hz), f2 (Hz) for those ultrasonic wave actuators 10, 12 are set to satisfy the following relationship:

$$|f1-f2|>4000.$$

Then, if set in this way, the frequency fB comes to a relationship of fB>2000 because of |f1−f2|>4000. This is higher by 1 or more octaves than 1 KHz, which is highest in acoustic sensitivity, and, therefore, the "beat" grating on the ear of the user (photographer) of the camera 1 can be prevented from being produced.

Note that herein, as obvious from the explanation given above, there has been shown the condition of |f1−f2|>4000 so that the "beat" phenomenon comes to 2000 or higher. The conditions effective in the apparatus required to further reduce noises are that, e.g., |f1−f2|>8000 to 20000 or thereabouts, and the "beat" frequency fB is set such as fB>4000 to 10000 or thereabouts.

Alternatively, if the above conditions are set such that |f1−f2|>24000 or thereabouts, and fB>12000 or thereabouts, this is, as a matter of fact, beyond the audible bandwidth of a human being, and hence a much larger effect can be obtained.

As a matter of course, if the "beat" phenomenon is not a problem in terms of powers of the ultrasonic wave actuators 10, 12, the above frequencies are set such as f1≠f2, and it may suffice to only restrain the resonance.

Note that a drum type (pencil type) actuator disclosed in, e.g., Japanese Patent Application Laid-Open No. 5-146174 may be employed as the ultrasonic wave actuators 10, 12 used for driving the apparatus like the above-described camera 1, etc. The actuator is not, however, confined to that type of actuator, and the ultrasonic wave actuators having a variety of structures may be freely employed.

Figure 3:
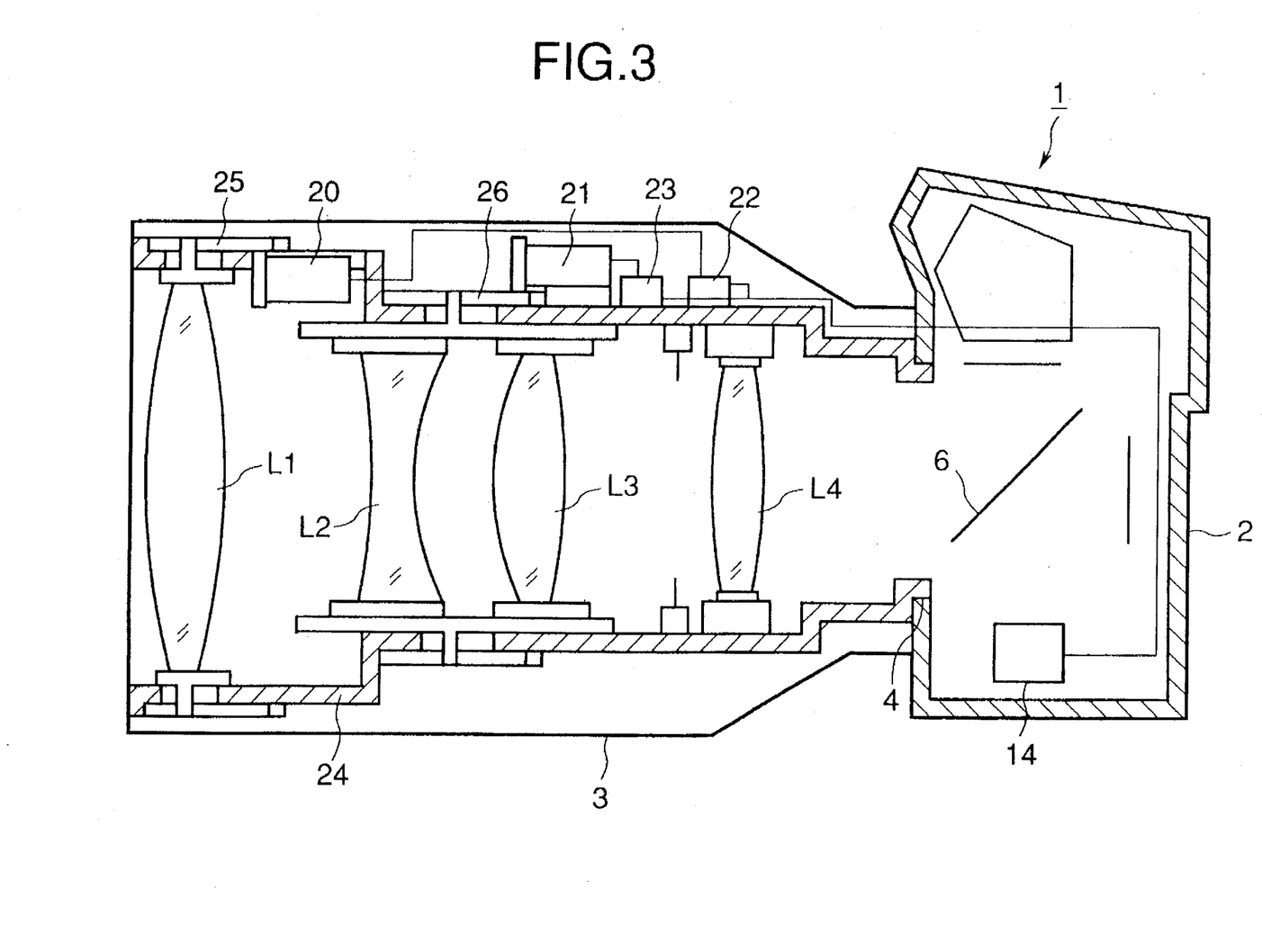
FIG. 3 is a view schematically illustrating a construction of another embodiment of the camera suited to an application of the actuator built-in apparatus of the present invention.

FIG. 3 illustrates another embodiment of the camera effective when the present invention is applied thereto. Referring to FIG. 3, there is shown a case where two sets of ultrasonic wave actuators 20, 21 are incorporated into the lens barrel 3 of the camera 1.

These first and second ultrasonic wave actuators 20, 21 are defined as autofocus driving and power zoom driving actuators that are simultaneously operated during a photography standby operation such as focusing, framing, etc. in many cases.

Herein, referring to FIG. 3, first and second ultrasonic actuator drive portions 22, 23 are provided on part of an outer peripheral portion of a fixed drum 24 constituting the lens barrel 3, wherein the above drive portions 22, 23 serve to, as in the same way with the above-discussed embodiment, drive-control the ultrasonic wave actuators 20, 21 at different drive frequencies. These ultrasonic wave actuator drive portions are so constructed as to be drive-controlled by an apparatus control portion 14 provided in the camera body 2.

Further, the lens barrel 3 is fitted into the lens mount 4 of the camera body 2 and thus mechanically fixedly joined thereto. A focus ring designated at 25 in FIG. 3 is focus-driven by the first ultrasonic wave actuator 20, and a zoom ring represented at 26 is power-zoom-driven by the second ultrasonic wave actuator 21.

Note that the symbols L1, L2, L3, L4 in the Figure denote lens units constituting a photographing optical system held in the lens barrel 3. In addition to these lens units, there are also provided mechanisms and parts needed for constituting the lens barrel 3. The details thereof are well known, and hence a specific explanation thereof will be omitted.

Then, the two sets of ultrasonic wave actuators 20, 21 in the thus constructed lens barrel 3 also have, as stated above, different drive frequencies, and consequently, as a matter of course, the same action and effect as the above-mentioned are to be obtained.

Figure 4:
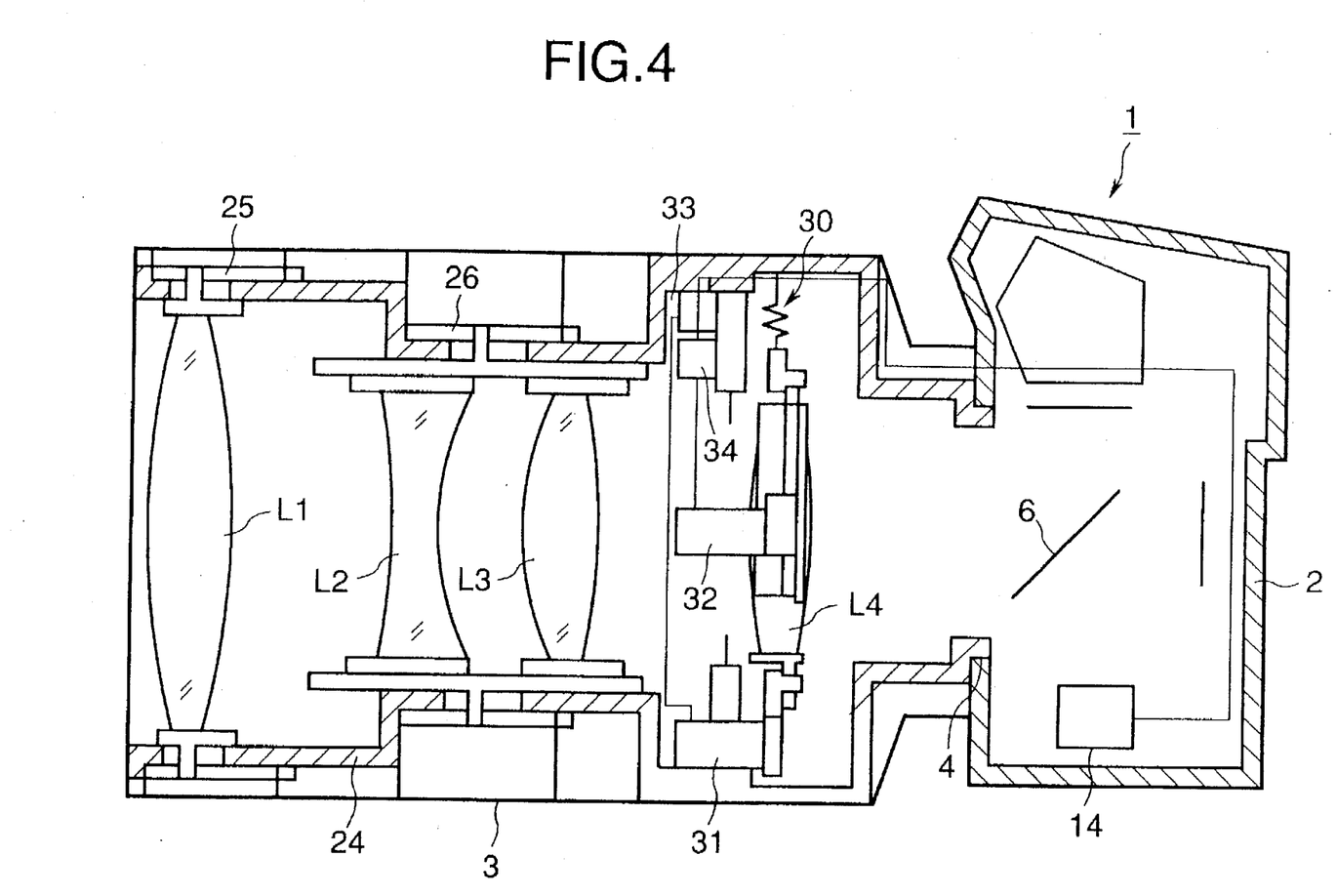
FIG. 4 is a view schematically illustrating still another embodiment of the camera suited to the application of the actuator built-in apparatus of the present invention.
Figure 5:
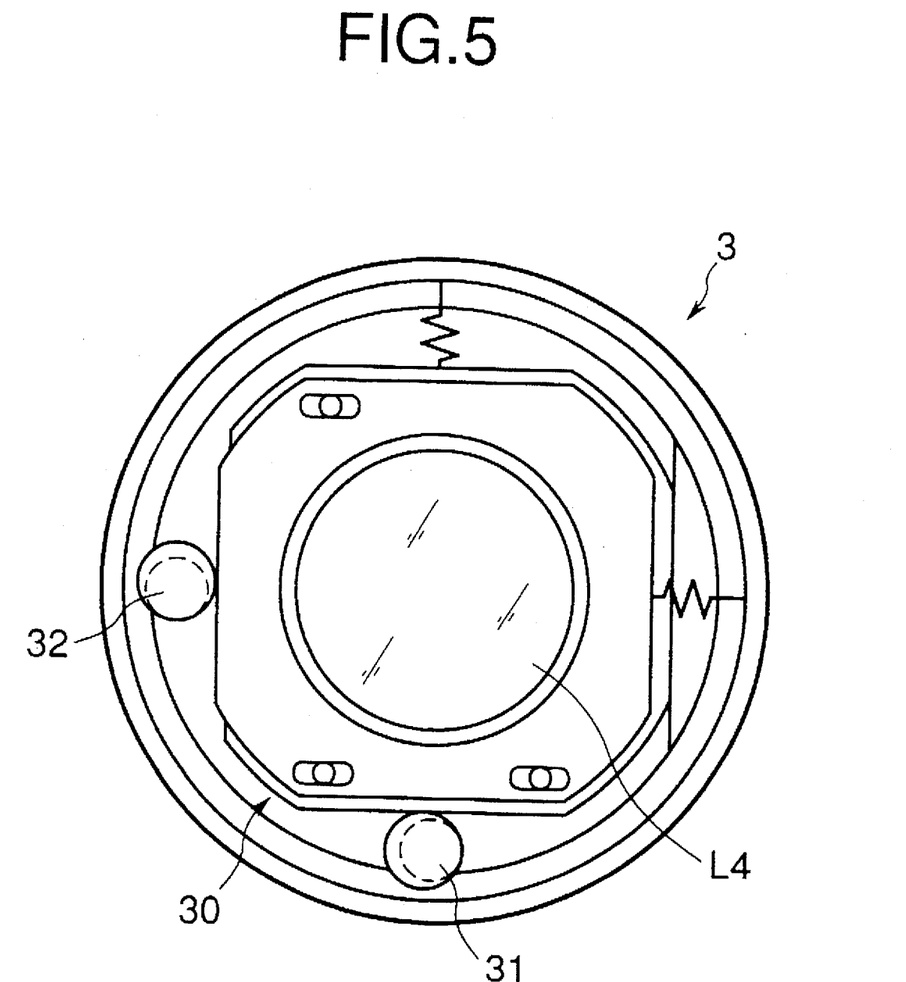
FIG. 5 is a sectional view schematically illustrating principal components of a vibration compensation mechanism for driving a vibration compensation lens in FIG. 4.

FIGS. 4 and 5 illustrate still another embodiment of the camera suited to the application of the present invention. This embodiment also presents a construction in which the lens barrel 3 of the camera 1 incorporates a vibration compensation mechanism including two sets of ultrasonic wave actuators 31, 32.

Herein, the symbol L4 designates a vibration compensation lens movable within the plane orthogonal to the optical axis in order to correct an image blur in the photographing optical system.

Ultrasonic wave actuators 31, 32 are employed as two sets of driving actuators for driving the vibration compensation lens L4 in X- and Y-axis directions in the vibration compensation mechanism 30 for correcting the image blur caused due to a camera shake of the camera 1. Then, the first and second ultrasonic wave actuators 31, 32 for the vibration compensation driving are simultaneously operated to drive the vibration compensation lens L4 in the X- and Y-axis directions during the exposure operation.

Accordingly, even the two sets of ultrasonic wave actuators 31, 32 in the above-constructed lens barrel 3 have different drive frequencies as explained above, thereby obtaining the same action and effects as those in the embodiments discussed above.

Note that the constructions of the respective portions from the above-mentioned vibration compensation mechanism 30 down in this embodiment have hitherto been well known, and therefore specific illustrations and descriptions thereof will be omitted.

Figure 6:
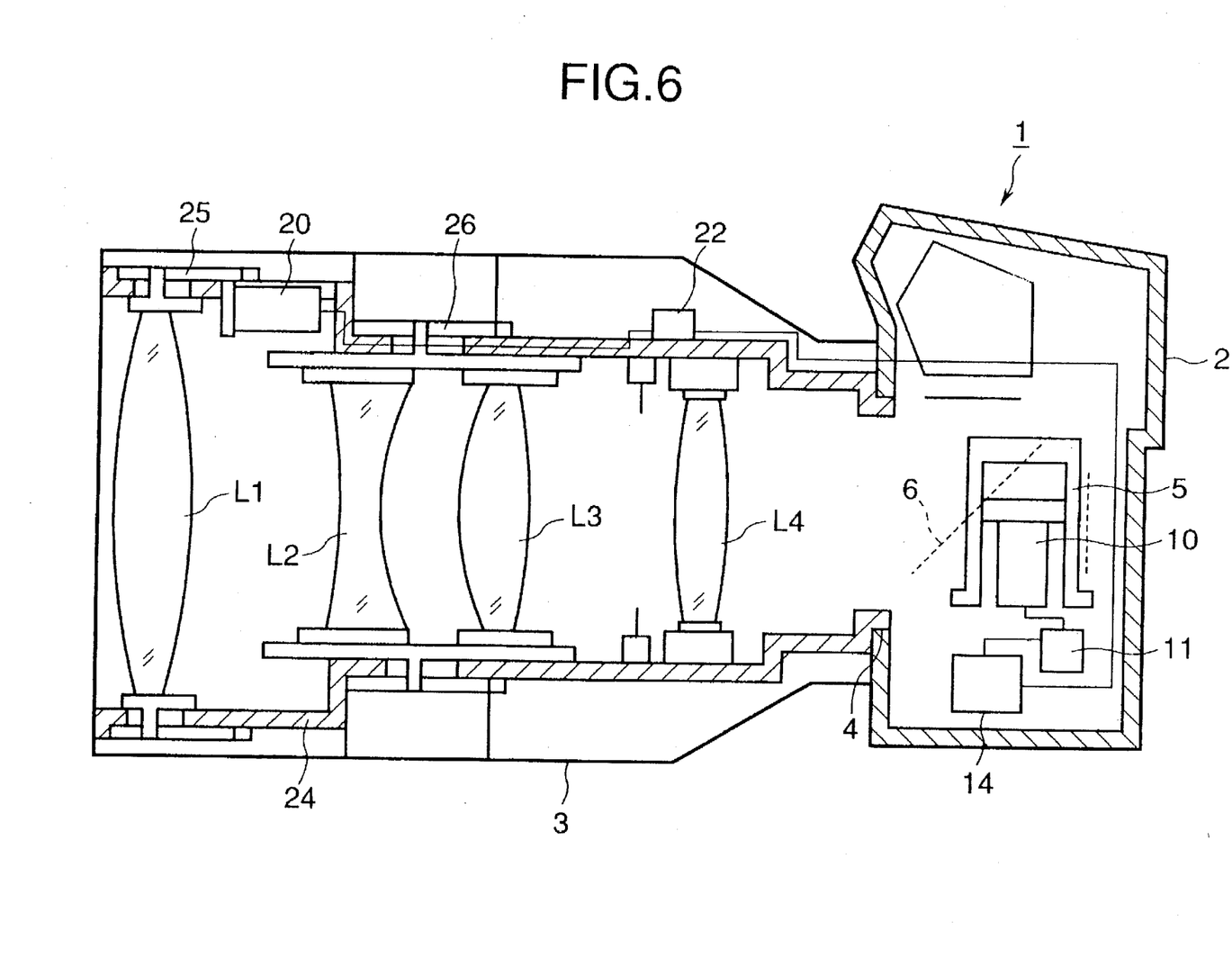
FIG. 6 is a view schematically illustrating yet another embodiment of the camera suited to the application of the actuator built-in apparatus of the present invention.

FIG. 6 illustrates yet another embodiment of the present invention. This embodiment presents a construction in which each of the camera body 2 and the lens barrel 3 has one set of ultrasonic wave actuators for driving the apparatus, the camera body 2 and the lens barrel 3 being integrally assembled through a mechanical joint unit, i.e., through the lens mount 4 in the camera 1.

That is, in this embodiment, the first ultrasonic wave actuator 20 is used for the autofocus drive, while the second ultrasonic wave actuator 10 is employed for the film wind-up drive.

With respect to the above autofocus drive and the film wind-up drive, the focusing drive operation and the film winding operation are simultaneously performed when photographed in, e.g., the consecutive photographing mode. Then, in this case, the camera body 2 and the lens barrel 3 are mechanically joined through the mount 4, and hence it can be easily understood that leakage vibrations are transferred to each other, and the resonance or the "beat" phenomenon are produced.

Then, the structure in this embodiment also exhibits the same action and effect as those in the embodiments discussed above by making the drive frequencies of the first and second ultrasonic wave actuators 20, 10 different by the respective ultrasonic wave actuator drive portions 22, 11.

Note that each embodiment discussed above presents the construction in which the ultrasonic wave actuators are employed for winding the film, driving the mirror, effecting the autofocus drive, the power zoom drive and performing the drive in the X- and Y-axis directions for compensating the vibration. The usage and applied portion of the ultrasonic actuator are not limited to the above-mentioned.

For instance, the ultrasonic wave actuator may be, as a matter of course, employed for driving a variety of movable mechanisms such as driving the aperture of the lens, rewinding the film and so on.

Figure 7:
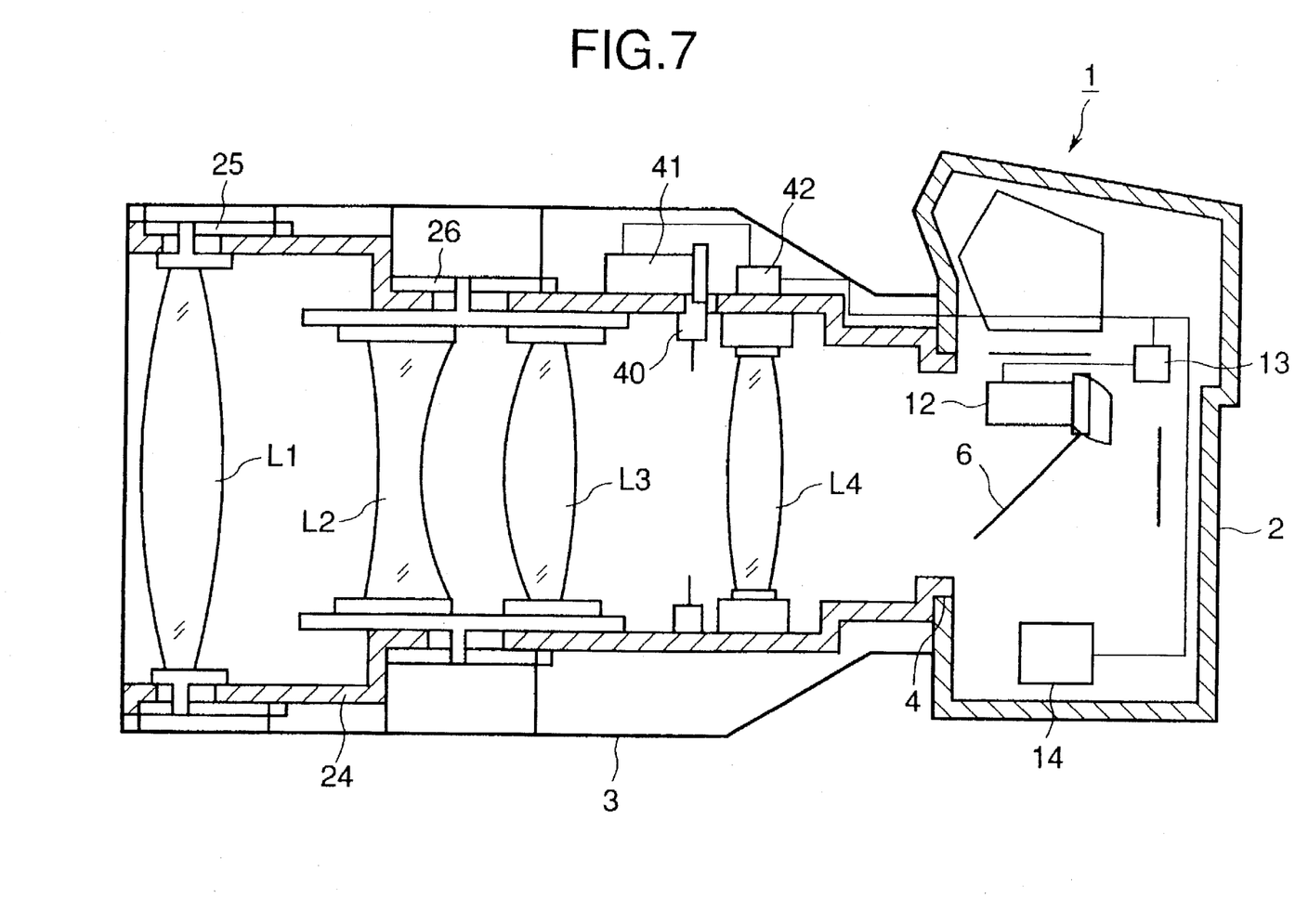
FIG. 7 is a view schematically illustrating a further embodiment of the camera suited to the application of the actuator built-in apparatus of the present invention.

FIG. 7 illustrates a construction in which first and second ultrasonic wave actuators 41, 12 are employed for driving the mirror in the camera body 2 as well as for driving the aperture in the lens barrel 3 of the camera 1. The details thereof are the same as those in each embodiment discussed above.

Herein, the numeral 40 in the Figure represents a lens aperture mechanism disposed in front of the lens L4, and the numeral 42 designates a drive portion of the second ultrasonic wave actuator 41.

Further, the structure and the type or the applied form of the ultrasonic wave actuator are not limited to those exemplified in the above-discussed embodiments, but the actuator may take a drum-type or a ring-type or other types of shape.

Note that each of the embodiments discussed above has dealt with the construction in which the two sets of ultrasonic wave actuators 10, 12; 20, 21; ... are incorporated into the apparatus such as the camera 1, etc. The present invention is not confined to this construction but is similarly applicable to such a construction that three or more sets of ultrasonic wave actuators are incorporated into the apparatus enough to exhibit the effects.

That is, when including three or more sets of ultrasonic wave actuators, the actuator may be constructed to satisfy one of the following two conditions:

(1) the respective ultrasonic wave actuators are driven substantially at different drive frequencies; or (2) the drive frequency of the first ultrasonic wave actuator is set at f1 (Hz), the drive frequency of the second ultrasonic actuator is set at f2 (Hz), the drive frequency of the third ultrasonic wave actuator is set at f3 (Hz), ... and the drive frequency of the n-th ultrasonic wave actuator is set at fn (Hz). In this case, it may suffice to meet the following conditions:

$$|f1 - f2| > 4000$$
$$|f1 - f3| > 4000$$
$$\vdots$$
$$|f1 - fn| > 4000$$
$$|f2 - f3| > 4000$$
$$\vdots$$
$$|f(n-1) - fn| > 4000.$$

Of course, the conditions in term of numerical values are not limited to the above. As in the case of using the two sets of ultrasonic wave actuators described above, multiple selections may be made.

In short, it may be enough to only set the respective frequencies set such as $f1 \neq f2$, $f1 \neq f3$, ... , $f(n-1) \neq fn$.

Figure 8:
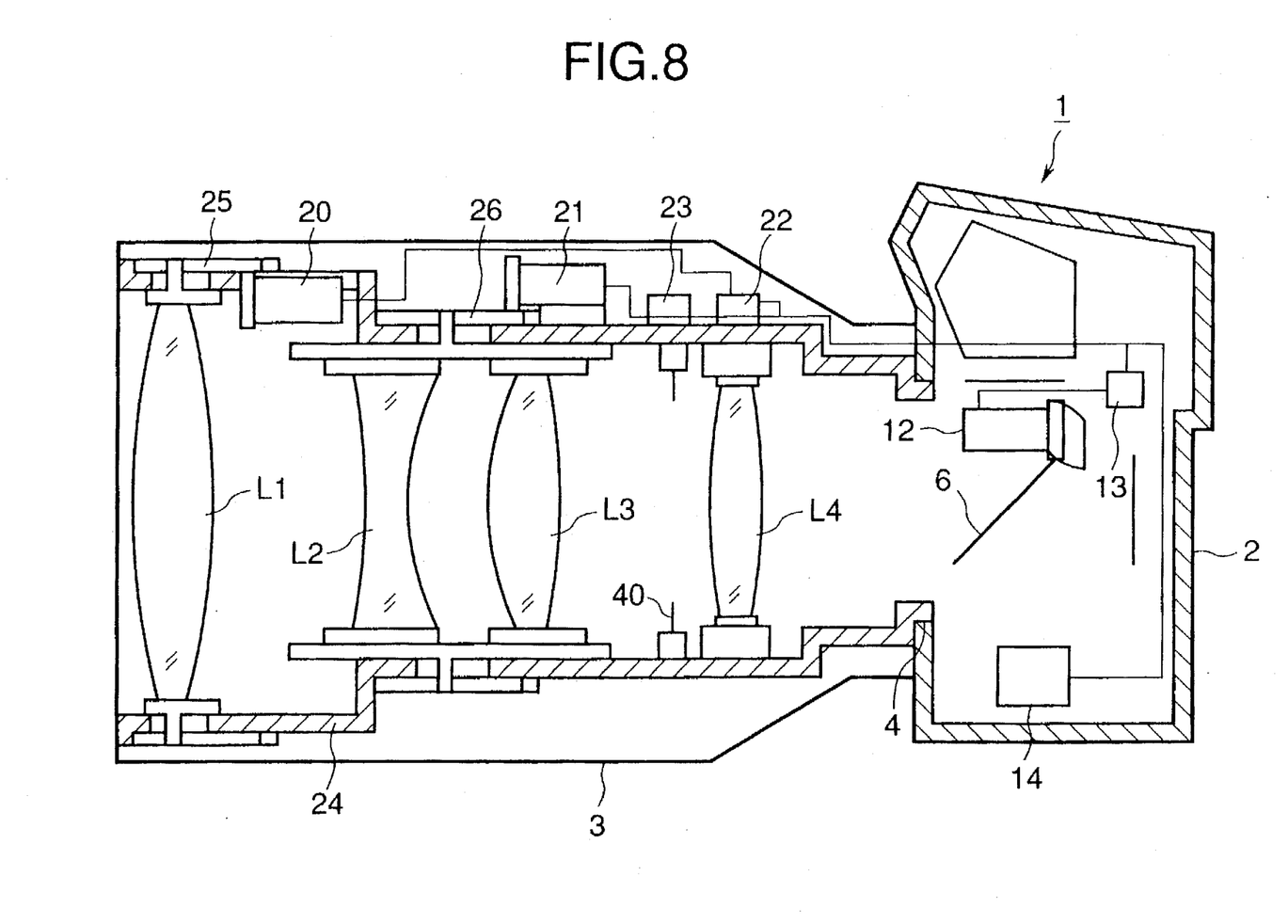
FIG. 8 is a view schematically illustrating a still further embodiment of the camera suited to the application of the actuator built-in apparatus of the present invention.
Figure 9:
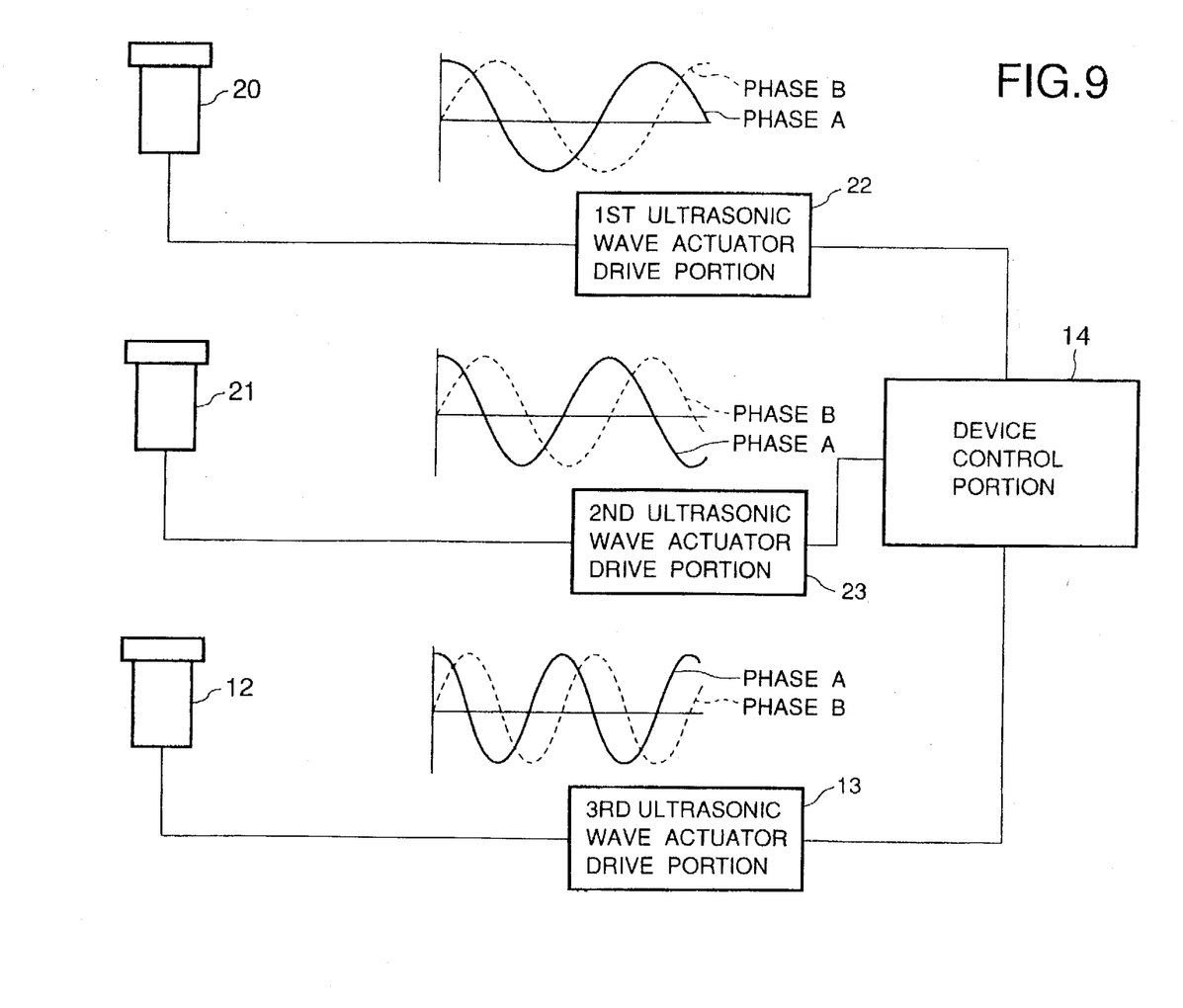
FIG. 9 is a block diagram showing another embodiment of the principal components in the camera shown in FIG. 8.

FIGS. 8 and 9 illustrate modified embodiments thereof. As apparent from FIG. 8, the lens barrel 3 of the camera 1 incorporates two sets of ultrasonic wave actuators 20, 21, while the camera body 2 incorporates a single ultrasonic wave actuator set 12.

Herein, the lens barrel 3 is provided with the first ultrasonic wave actuator 20 for the autofocus drive, the second ultrasonic wave actuator 21 for the power zoom drive and the third ultrasonic wave actuator for the mirror drive.

The structure of such an embodiment exhibits, as a matter of course, the same action and effect as those in the above-described embodiments by driving the respective ultrasonic wave actuators 20, 21, 12, as obvious from FIG. 9, at different drive frequencies.

Figure 10:
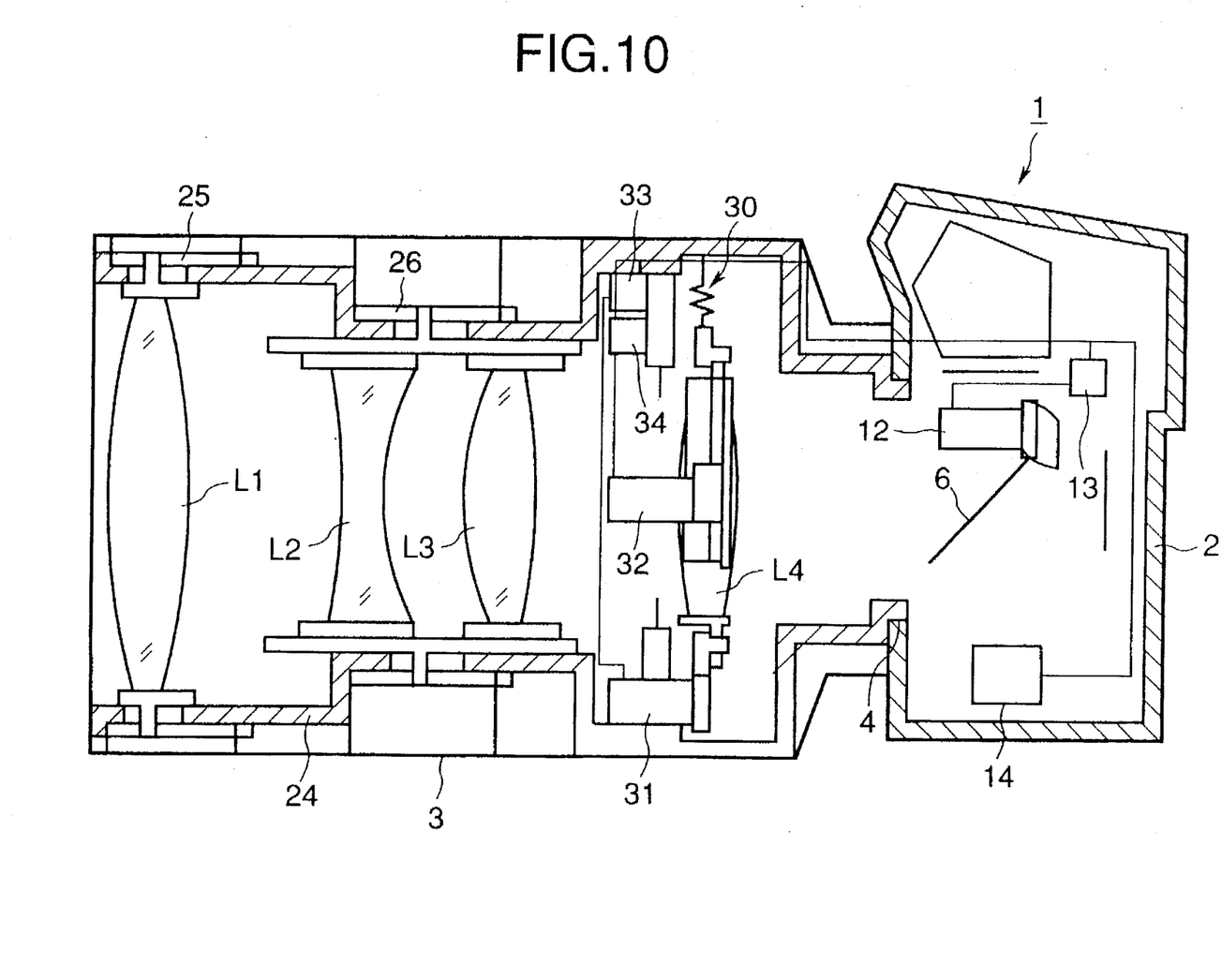
FIG. 10 is a view schematically illustrating a yet further embodiment of the camera suited to the application of the actuator built-in apparatus of the present invention.

FIG. 10 illustrates a construction wherein the lens barrel 3, as in the above-discussed embodiments, incorporates two sets of ultrasonic wave actuators 31, 32, while the camera body 2 includes one ultrasonic wave actuator set 12.

Herein, this embodiment presents a construction in which the lens barrel 3 incorporates the first and second ultrasonic wave actuators 31, 32 for the X- and Y-axis directional drive in the vibration compensation drive mechanism 30 as in the embodiment of FIG. 4, and the third ultrasonic wave actuator 12 serves to drive the mirror.

Even such a construction can exhibit the same action and effect as the above-mentioned by taking the above-mentioned construction of the present invention, i.e., by effecting the drive at the different frequencies.

Note that the present invention is not confined to the above-stated structure of the embodiment but may take adequate modifications and variations in terms of shapes and structures of the respective portions of the camera defined as the actuator built-in apparatus, and a variety of modified embodiments can be, as a matter of course, contrived.

For example, in the embodiments discussed above, there has been exemplified the camera 1 as the actuator built-in apparatus to which the present invention is applied. The present invention is not, however, limited to this but is, in short, capable of exhibiting the effects when applied to such an actuator built-in apparatus that at least two or more sets of ultrasonic wave actuators are employed in Combination as the apparatus driving actuators, and these ultrasonic wave actuators may be simultaneously driven.

As discussed above, the actuator built-in apparatus according to the present invention has at least the first and second ultrasonic wave actuators simultaneously driven in combination as the apparatus driving actuators, wherein the drive frequencies thereof are set different. Hence, the resonance in the apparatus structural body can be prevented or relieved in spite of the simple construction.

Therefore, the present invention can exhibit such an effect that the drawback inherent in the problem of resonance described above, especially the "beat" phenomenon hitherto grating on the ear of the user of the apparatus can be prevented from being produced or relieved.

This will be easily understood from $fB=|f1-f2|/2$, where f1 (Hz) is the drive frequency of the first ultrasonic wave actuator, f2 (Hz) is the frequency of the second ultrasonic wave actuator, and further fB (Hz) is the frequency of the possible-to-occur "beat".

Further, the present invention is, when using the camera as the actuator built-in apparatus, capable of exhibiting the above action and effect in even such a construction that the first and second ultrasonic wave actuators are disposed in one of the camera body and the lens barrel or in both of the camera body and the lens barrel which are mechanically joined.

Moreover, in the actuator built-in apparatus according to the present invention, f1 (Hz) and f2 (Hz) are set to satisfy the relationship of $|f1-f2|>4000$, where f1 (Hz) is the drive frequency of the first ultrasonic wave actuator, and f2 (Hz) is the drive frequency of the second ultrasonic wave actuator. With this setting, the frequency fB becomes fB>2000, which is higher by 1 or more octaves than 1 KHz, which is highest in the acoustic sensitivity, and it is therefore possible to prevent the occurrence of the "beat" phenomenon grating on the ear of the apparatus user (photographer).

It is apparent that, in this invention, a wide range of different working modes can be formed based on the invention without deviating from the spirit and scope of the invention. This invention is not restricted by its specific working modes except being limited by the appended claims.

What is claimed is:

1. An actuator built-in apparatus comprising:
   a first ultrasonic wave actuator; and
   a second ultrasonic wave actuator driven simultaneously with said first ultrasonic wave actuator,
   wherein a drive frequency of said first ultrasonic wave actuator is different from a drive frequency of said second ultrasonic wave actuator,
   wherein the following relationship is established $$|f1-f2|>4000$$

where f1 (Hz) is the drive frequency of said first ultrasonic wave actuator, and f2 (Hz) is the drive frequency of said second ultrasonic actuator.

2. An actuator built-in apparatus according to claim 1, said actuator built-in apparatus is a camera, and wherein
   said first and second ultrasonic wave actuators are disposed in a camera body of said camera.

3. An actuator built-in apparatus according to claim 2, wherein said first actuator is used as a spool drive device of a film, and
   said second actuator is used as a mirror drive device.

4. An actuator built-in apparatus according to claim 1, wherein said actuator built-in apparatus is a camera, and
   said first and second ultrasonic wave actuators are disposed in a lens barrel of said camera.

5. An actuator built-in apparatus according to claim 4, wherein said first actuator is used as an autofocus drive device, and
   said second actuator is used as a zooming drive device.

6. An actuator built-in apparatus according to claim 4, wherein said first actuator is used as an X-axis directional drive device of a compensation lens, and
   said second actuator is used as a Y-axis directional drive device of the compensation lens.

7. An actuator built-in apparatus according to claim 1, wherein said actuator built-in apparatus is a camera,
   said first ultrasonic wave actuator is disposed in a camera body of said camera,
   said second ultrasonic wave actuator is disposed in a lens barrel of said camera, and
   said camera body and said lens barrel are mechanically joined.

8. An actuator built-in apparatus according to claim 7, wherein said first ultrasonic wave actuator is used as a spool drive device, and
   said second ultrasonic wave actuator is used as an autofocus drive device.

9. An actuator built-in apparatus according to claim 7, wherein said first ultrasonic wave actuator is used as a mirror drive device, and
   said second ultrasonic wave actuator is used as an aperture drive device.

10. An actuator built-in apparatus comprising:
    n-sets of ultrasonic wave actuators simultaneously driven,
    wherein the following relationship is established $$|f(n-k)-fn|>4000$$

where fn (Hz) is the drive frequency of said n-th ultrasonic wave actuator, and k=1, 2, ... n−1, and
    wherein n is a natural number greater than or equal to 3.

11. An actuator built-in apparatus according to claim 10, wherein n is 3,
    said first ultrasonic wave actuator is used as an autofocus drive device,
    said second ultrasonic wave actuator is used as a zoom drive device, and
    said third ultrasonic wave actuator is used as a mirror drive device.

12. An actuator built-in apparatus according to claim 10, wherein n is 3,
    said first ultrasonic wave actuator is used as an X-axis directional drive device of a compensation lens,
    said second ultrasonic wave actuator is used as a Y-axis directional drive device of the compensation lens, and
    said third ultrasonic wave actuator is used as a mirror drive device.

* * * * *